(12) United States Patent
Murphy et al.

(10) Patent No.: US 6,567,520 B1
(45) Date of Patent: May 20, 2003

(54) METHOD AND APPARATUS FOR DETECTING MULTIPLE TELEPHONE OFF-HOOK CONDITIONS

(75) Inventors: Timothy F. Murphy, Ramona, CA (US); Christopher R. Hansen, Grass Valley, CA (US)

(73) Assignee: 3Com Corp., Santa Clara, CA (US)

( * ) Notice: Subject to any disclaimer, the term of this patent is extended or adjusted under 35 U.S.C. 154(b) by 0 days.

(21) Appl. No.: 09/251,174

(22) Filed: Feb. 17, 1999

(51) Int. Cl.[7] ................................................ H04M 3/00
(52) U.S. Cl. ........................................ 379/377; 379/164
(58) Field of Search ............................ 379/352, 106.08, 379/100.06, 377, 164

(56) References Cited

U.S. PATENT DOCUMENTS 5,638,437 A * 6/1997 Bettan et al. ................ 379/353
6,128,373 A * 10/2000 Mathe et al. ............. 379/93.05

OTHER PUBLICATIONS

"Splitterless Asymmetric Digital Subscriber Line (ADSL) Transceivers", ITU–T G.992.2, Jun. 1999, pp. i–165.

* cited by examiner

*Primary Examiner*—Forester W. Isen
*Assistant Examiner*—Jefferey Harold
(74) *Attorney, Agent, or Firm*—McDonnell Boehnen Hulbert & Berghoff

(57) ABSTRACT

A method and apparatus for the detection of one or more telephone off-hook conditions using an analog-to-digital converter to detect voltage changes between tip and ring lines of a telephone network loop. An isolation network provides substantial electrical isolation for a detection device from voltage surges on the tip and ring lines of a "plain old telephone system" (POTS) network. The isolation network also provides a minimal load on the POTS wiring system, so as not to cause a false detection of an off-hook condition by central office equipment. A gain amplifier is used to scale the tip and ring voltage to a suitable range for an analog-to-digital converter (ADC). The ADC outputs a digital voltage value to a decision-making element, such as a microprocessor, a digital signal processor, or a state machine. The decision-making element can detect when multiple POTS devices coupled to the network wiring loop go into an off-hook state. The invention can also detect and compensate for a tip/ring wiring pair reversal and is highly reliable.

8 Claims, 3 Drawing Sheets

METHOD AND APPARATUS FOR DETECTING MULTIPLE TELEPHONE OFF-HOOK CONDITIONS

TECHNICAL FIELD

This invention relates to telephone network systems, and more particularly to a method and apparatus for detection of single and multiple telephone off-hook conditions.

BACKGROUND

When connecting certain types of electronic equipment to in-home telephone wiring, it is often advantageous for such equipment to recognize when a telephone or other "plain old telephone system" (POTS) device goes "off-hook" (i.e., becomes active and draws current from the POTS network loop). For example, digital subscriber line (DSL) modems, particularly those that conform to the recently approved G.992.2 (formerly G.LITE) standard, may have to retrain equalization circuits when line conditions change due to one or more POTS devices going off-hook.

FIG. 1 is a block diagram showing a prior art POTS system. A POTS device 1, such as a telephone or answering machine, is coupled by telephone network wiring 2 to a central office 3 having POTS terminating equipment. An on/off hook monitoring device 4 is also coupled to the telephone network wiring 2. Conventionally, two of the wires comprising the telephone network wiring 2 are known as "tip" and "ring". When POTS devices 1 are not drawing loop current, the tip-to-ring differential voltage is generally equal to the central office 3 battery voltage (less some small amount due to resistance losses), which typically is in the range of −40 to −47 volts DC. When a POTS device 1 off-hook condition occurs, the central office 3 can detect current draw and will provide a current limited source. In conventional POTS systems, a current draw of as little as about 5 milliamps is detected by the central office 3 as an off-hook condition. Such current draw will result in the tip-to-ring DC voltage dropping typically to about 10 to 15 volts DC. As additional POTS devices are taken off-hook, the current draw increases, resulting in an additional voltage drop of typically 1 to 3 volts DC across the tip/ring wire pair for each additional device.

A device that needs to monitor an off-hook condition would generally be connected to in-home wiring in a parallel (as opposed to serial) circuit. Thus, it is not feasible to use current detection to monitor the on/off hook state of POTS devices 1, since normally it cannot be guaranteed that the monitoring device will be coupled to the wiring at a point where current flow would always be detectable.

Prior art on/off hook detection devices have typically monitored the tip-to-ring voltage to determine if the voltage is above or below a preset threshold. An off-hook state is determined when the tip-to-ring voltage falls below the preset voltage. This approach limits the detection circuit to reporting off-hook or on-hook states only, with no capability of detecting when more than one POTS device has gone off-hook within a wiring loop.

Accordingly, the inventor has determined that it would be desirable to determine whether multiple POTS devices are off-hook. The present invention provides a solution to this problem.

SUMMARY

The invention includes a method and apparatus for the detection of one or more telephone off-hook conditions using an analog-to-digital converter to detect voltage changes between tip and ring lines of a telephone network loop. In the preferred embodiment, an isolation network provides substantial electrical isolation for a detection device from voltage surges on the tip and ring lines of a POTS network. The isolation network also provides a minimal load on the POTS wiring system, so as not to cause a false detection of an off-hook condition by central office equipment. A gain amplifier is used to scale the tip and ring voltage to a suitable range for an analog-to-digital converter (ADC). The ADC outputs a digital voltage value to a decision-making element, such as a microprocessor, a digital signal processor, or a state machine. One advantage of the present invention is that the decision-making element can detect when multiple POTS devices coupled to the network wiring loop go into an off-hook state. The preferred embodiment of the invention can also detect and compensate for a tip/ring wiring pair reversal and is highly reliable.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
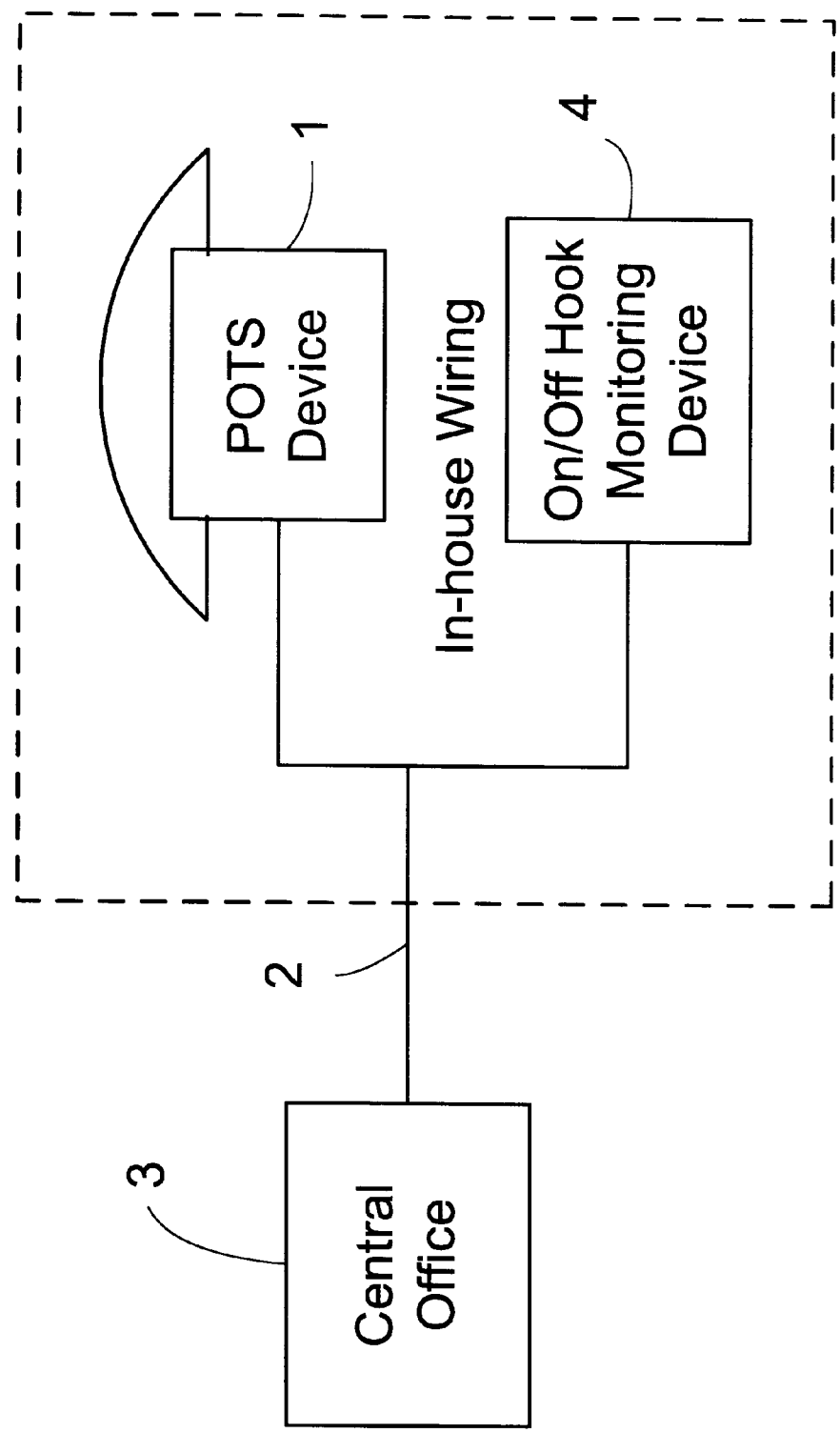
FIG. 1 is a block diagram showing a prior art telephone system.
Figure 2:
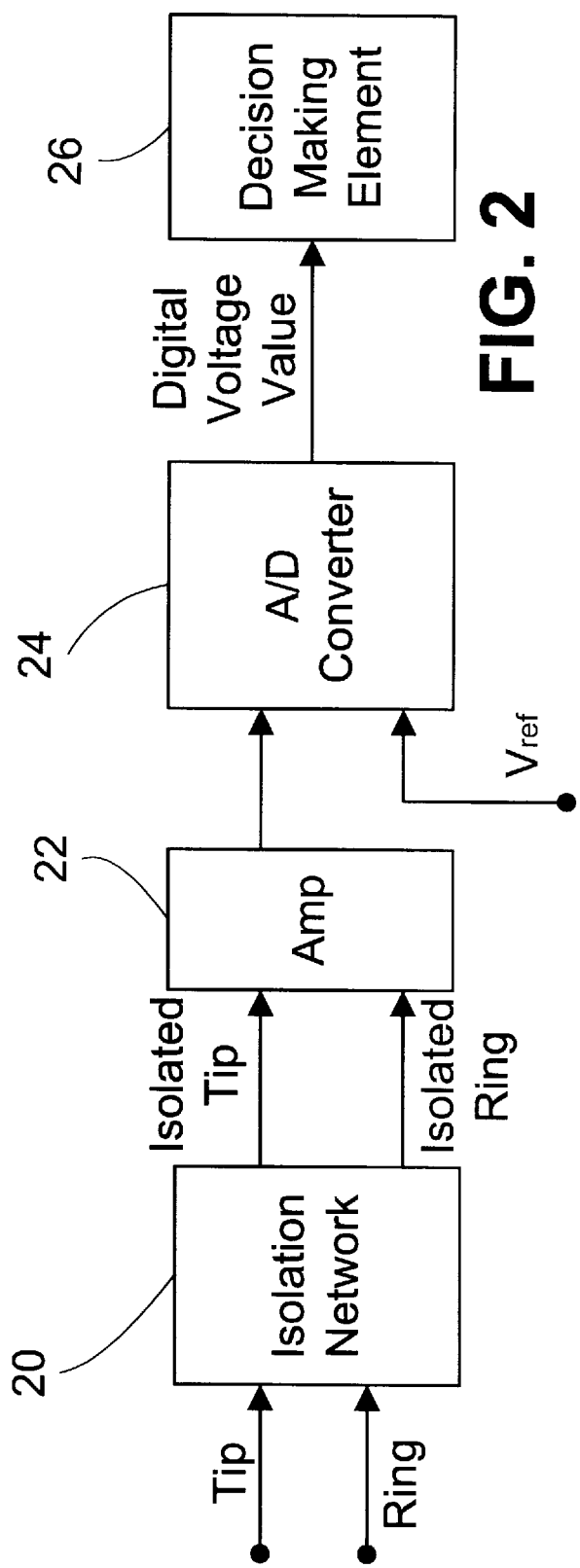
FIG. 2 is a block diagram showing the preferred architecture for the invention.

FIG. 2 is a block diagram showing the preferred architecture for the present invention. Tip and ring lines from an in-house loop of the telephone network wiring 2 of a POTS system are coupled to an isolation network 20. The isolation network 20 provides electrical isolation to the remainder of the device monitoring circuit, and presents a high impedance to the POTS system so as to prevent a current draw that would indicate a false off-hook condition to a central office 3. The isolated tip and ring lines are coupled to an amplifier 22 which scales the voltage to a range suitable for a conventional analog-to-digital converter (ADC). The scaled voltage is then provided to an ADC 24, which preferably generates a positive digital voltage value to represent tip and ring lines that have proper polarity, and a negative digital voltage value to indicate tip and ring lines that have reversed polarity. This digital voltage value is coupled to a decision-making element 26 which makes a determination based on the digital voltage values as to whether one or more POTS devices 1 are in an off-hook condition.

Figure 3:
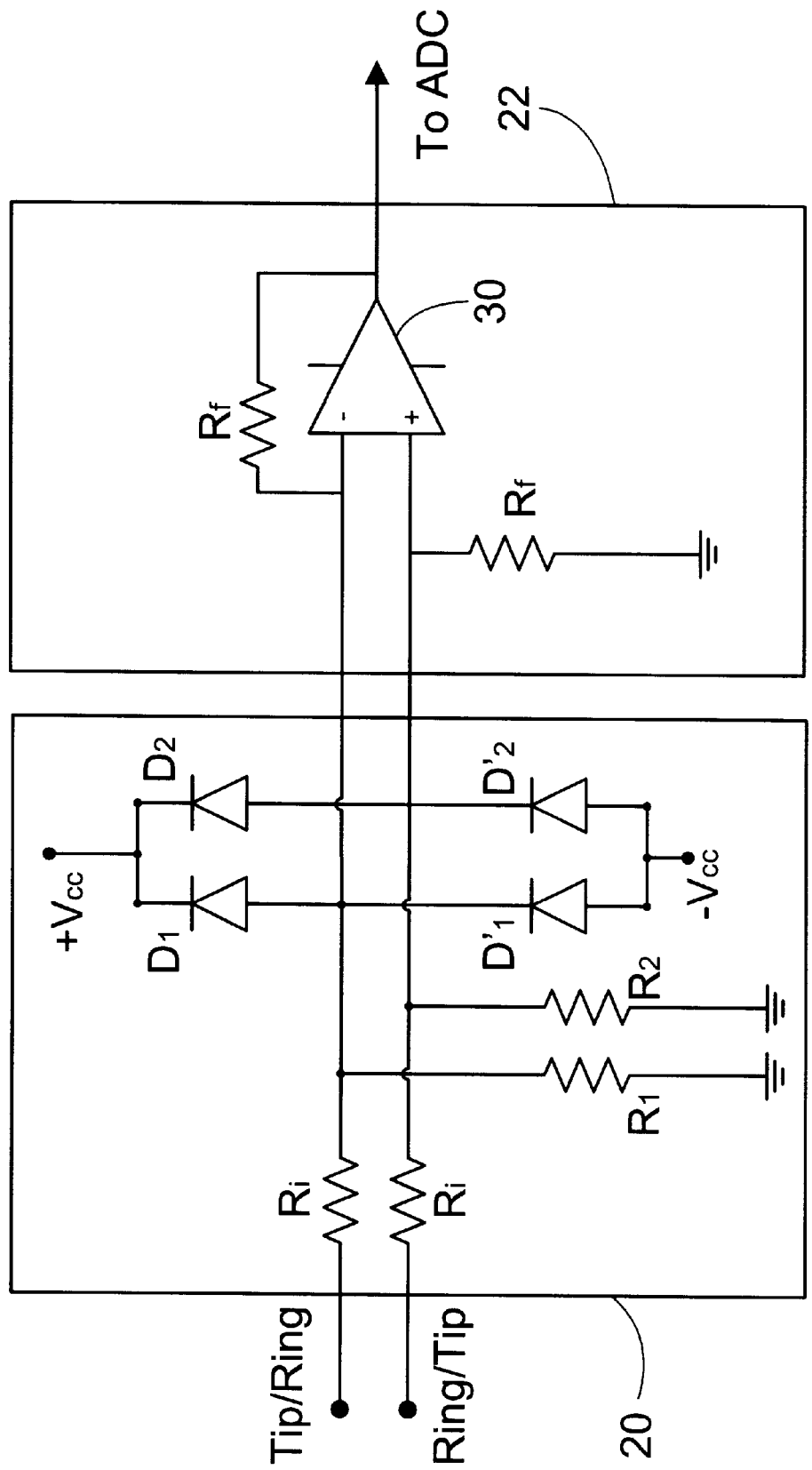
FIG. 3 is a schematic diagram of a preferred implementation of the isolation network and amplifier shown in FIG. 2.

FIG. 3 is a schematic diagram of a preferred implementation of the isolation network and amplifier 22 shown in FIG. 2. The tip and ring lines are applied to two inputs of the isolation network 20, in either possible coupling. The input resistors $R_i$ provide the high impedance necessary to avoid false off-hook conditions at a central office by limiting current draw of the isolation network 20 to less than the system minimum (typically less than about 5 milliamps).

Typical values for the resistances $R_i$ are approximately 40 megohms or greater.

One input resistor $R_i$ and a ground connection resistor $R_1$ form a first voltage divider which is coupled to one input of a differential amplifier 30. A second input resistor $R_i$ and a ground connection resistor $R_2$ form a second voltage divider which is coupled to a second input of the differential amplifier 30. Essentially, the input voltage is attenuated by the voltage dividers and then amplified by the differential amplifier 30. Negative and positive feedback resistors $R_f$ provide the necessary feedback for the differential amplifier 30, and determines the output voltage range of the amplifier. In the preferred embodiment, an optional network of diodes $D_1$, $D'_1$, $D_2$, $D'_2$ protect against input surges on the tip and ring lines.

In the illustrated embodiment, the isolation network 20 provides approximately 1500 volts of isolation between the tip/ring inputs and the differential amplifier 30.

The combination of the voltage divider input and the differential amplifier 30 provides a scaling function that reduces the tip-to-ring voltage from its typical value of $-40$ to $-47$ volts DC to a range more suitable to a conventional ADC, such as $-3.5V$ to $+3.5V$. By using the configuration shown in FIG. 3, the output of the differential amplifier 30 ranges from a positive maximum to a negative maximum for the allowed output range. Thus, if the tip and ring lines have proper polarity, the output of the differential amplifier 30 will be, for example, a positive voltage. If the tip and ring inputs are reversed, the output of the differential amplifier 30 will be a negative voltage. By application of a suitable reference voltage to the ADC 24, where the reference voltage is set as approximately the mid-range voltage value of the output range of the differential amplifier 30, the ADC 24 will generate a positive number if the tip and ring inputs have proper polarity (thus outputting a positive voltage from the differential amplifier 30) and a negative number if the tip and ring inputs are reversed (thus outputting a negative voltage from the differential amplifier 30).

The ADC 24 should have sufficient resolution to report different voltage levels for each POTS device as that device goes to an off-hook state. In the preferred embodiment, a suitable resolution level is 8 bits, which provides 128 different voltage levels plus a sign bit that indicates the polarity of the tip/ring input lines.

Figure 4:
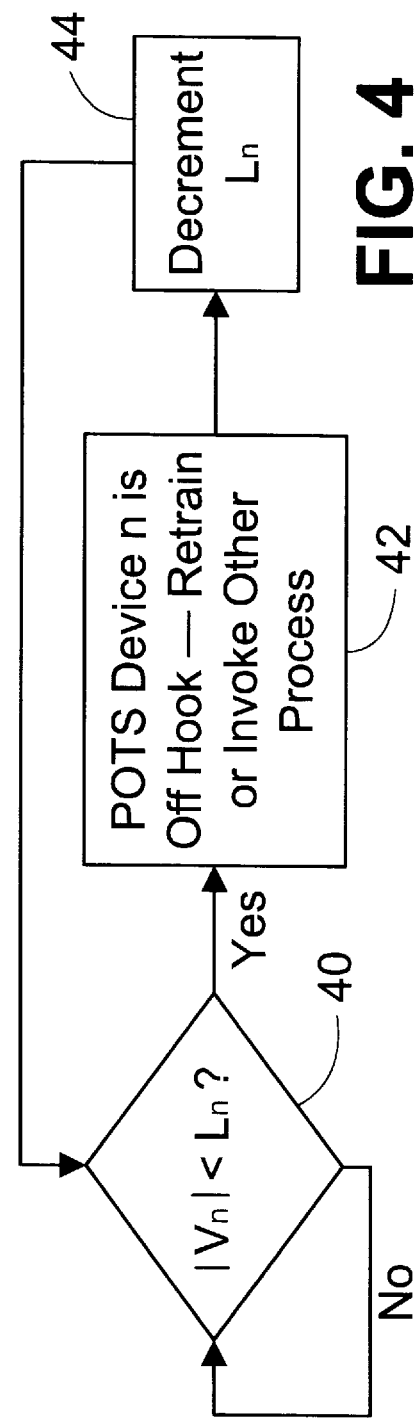
FIG. 4 is a flowchart of a preferred decision-making process.

The decision-making element 26 should monitor the voltage levels output by the ADC 24 and determine if one or more POTS devices 1 have been taken off-hook. FIG. 4 is a flowchart of the preferred decision-making process. In the preferred embodiment, the decision-making element 26 receives a digital voltage value from the ADC 24 and compares the absolute value of the voltage value, $|V_n|$, to a preset threshold value, $L_n$, to determine if a POTS device 1 is off-hook (Step 40). If not, the decision-making element 26 continues to monitor the voltage levels output by the ADC 24. If so, then a POTS device 1 is off-hook, and such condition can be used, for example, to retrain an electronic device or initiate another process (Step 42). The threshold value, $L_n$, may then be decremented to a next comparison value (Step 44).

Using the absolute value eliminates the problem of reversed tip/ring polarity. The threshold value, $L_n$, may vary depending upon how many other POTS devices 1 are presently off-hook, and may be expressed in terms of absolute or relative values. In the preferred embodiment, the decision-making element 26 saves the number of off-hook devices in a storage element or as a value in a digital counter (e.g., a digital up/down counter).

For example, when a first POTS device 1 goes off-hook, the decision-making element 26 compares the voltage output of the ADC 24 to a first level $L_1$. This first threshold level may be, for example, an absolute value (e.g., 30 volts DC), or may be a relative value (e.g., 40% less than the on-hook voltage). If the measured voltage is less than (or less than or equal to) the preset threshold level $L_1$, then the decision-making element 26 indicates that the corresponding POTS device 1 is off-hook. This decision can be provided to other equipment, such as a DSL modem, so that the DSL modem can retrain its equalizers or invoke other processes in response to the determination of an off-hook condition. The decision-making element 26 stores an indicator that one POTS device has gone off-hook, in order to select a next threshold value to compare against digital voltage values received from the ADC 24.

The decision-making element 26 continues to monitor the digital voltage values from the ADC 24. If the absolute value of the digital voltage value is less than (or less than or equal to) a next threshold level $L_2$, then the decision-making element 26 again indicates that another POTS device 1 is off-hook. The threshold level for determining that a second POTS device 1 has gone off-hook may be different from the threshold value for the first POTS device 1, and again may be a relative or absolute value. Again, the decision-making element 26 retains the number of POTS devices 1 that have gone off-hook, in order to select a next threshold value to compare against digital voltage values received from the ADC 24.

In alternative embodiments, the decision-making element 26 can be programmed or configured to indicate subsequent on-hook conditions (e.g., where two POTS devices 1 are off-hook, and one of them is returned to the on-hook state), or to compare digital voltage values received from the ADC 24 to a plurality of number "bins" or ranges rather than to single threshold values, or to evaluate changes in voltages rather than make comparisons to voltage levels.

A number of embodiments of the present invention have been described. Nevertheless, it will be understood that various modifications may be made without departing from the spirit and scope of the invention. For example, the isolation network 20 may not be necessary if a high-impedance amplifier 22 is used. As another example, the amplifier 22 may not be necessary if a wide voltage range input ADC 24 is used. As yet another example, the isolation network 20 and the amplifier 22 may not be necessary if a high-impedance, wide voltage range input ADC 24 is used. Accordingly, other embodiments are within the scope of the following claims.

What is claimed is:

1. An apparatus for determining a number of telephone off-hook conditions within a wiring loop, including:

(a) a high input impedance, wide voltage range input analog-to-digital converter, coupled to tip and ring lines of a telephone type system, and having an output comprising a numeric value corresponding to a voltage differential between the tip and ring lines; and (b) a decision-making element, coupled to the output of the analog-to-digital converter, operable to determine the number of telephone off-hook conditions within the wiring loop based on a comparison of the output of the analog-to-digital converter to a plurality of threshold values stored in the decision-making element, wherein each of the plurality of threshold values is representative of a number of off-hook conditions.

2. An apparatus for determining a number of telephone off-hook conditions within a wiring loop, including:

(a) a high input impedance amplifier, having tip and ring inputs configured to be coupled to respective tip and ring lines of a telephone type system, and an output comprising a scaled value of a voltage differential between the tip and ring lines;

(b) an analog-to-digital converter coupled to the output of the amplifier and having an output comprising a numeric value corresponding to the scaled value output of the amplifier, and (c) a decision-making element, coupled to the output of the analog-to-digital converter, operable to determine the number of telephone off-hook conditions within the wiring loop based on a comparison of the output of the analog-to-digital converter to a plurality of threshold values stored in the decision-making element, wherein each of the plurality of threshold values is representative of a number of off-hook conditions.

3. An apparatus for determining a number of telephone off-hook conditions within a wiring loop, including:

(a) an isolation network having tip and ring inputs configured to be coupled to respective tip and ring lines of a telephone type system, and having isolated tip and ring outputs substantially electrically isolated from the tip and ring inputs;

(b) a wide voltage range input analog-to-digital converter, coupled to the isolated tip and ring outputs of the isolation network, and having an output comprising a numeric value corresponding to the voltage differential between the isolated tip and ring outputs, and (c) a decision-making element, coupled to the output of the analog-to-digital converter, operable to determine the number of telephone off-hook conditions within the wiring loop based on a comparison of the output of the analog-to-digital converter to a plurality of threshold values stored in the decision-making element, wherein each of the plurality of threshold values is representative of a number of off-hook conditions.

4. An apparatus for determining a number of telephone off-hook conditions within a wiring loop, including:

(a) an isolation network having tip and ring inputs configured to be coupled to respective tip and ring lines of a telephone type system, and having isolated tip and ring outputs substantially electrically isolated from the tip and ring inputs;

(b) an amplifier, coupled to the isolated tip and ring outputs of the isolation network, and an output comprising a scaled value of a voltage differential between the isolated tip and ring outputs;

(c) an analog-to-digital converter coupled to the output of the amplifier and having an output comprising a numeric value corresponding to the scaled value output of the amplifier, and (d) a decision-making element, coupled to the output of the analog-to-digital converter, operable to determine the number of telephone off-hook conditions within the wiring loop based on a comparison of the output of the analog-to-digital converter to a plurality of threshold values stored in the decision-making element, wherein each of the plurality of threshold values is representative of a number of off-hook conditions.

5. The apparatus of claim 1, wherein the analog-to-digital converter outputs a positive number if the tip and ring lines have a first polarity, and a negative number if the tip and ring lines have a second polarity, whereby a reversal of polarity of the tip and ring lines is detectable.

6. The apparatus of claim 2, wherein the analog-to-digital converter outputs a positive number if the tip and ring lines have a first polarity, and a negative number if the tip and ring lines have a second polarity, whereby a reversal of polarity of the tip and ring lines is detectable.

7. The apparatus of claim 3, wherein the analog-to-digital converter outputs a positive number if the tip and ring lines have a first polarity, and a negative number if the tip and ring lines have a second polarity, whereby a reversal of polarity of the tip and ring lines is detectable.

8. The apparatus of claim 4, wherein the analog-to-digital converter outputs a positive number if the tip and ring lines have a first polarity, and a negative number if the tip and ring lines have a second polarity, whereby a reversal of polarity of the tip and ring lines is detectable.

* * * * *